United States Patent [19]

Mitsui

[11] 4,400,676

[45] Aug. 23, 1983

[54] ELECTRICALLY INSULATED COIL

[75] Inventor: Hisayasu Mitsui, Yokohama, Japan

[73] Assignee: Tokyo Shibaura Denki Kabushiki Kaisha, Kawasaki, Japan

[21] Appl. No.: 212,157

[22] Filed: Dec. 2, 1980

[30] Foreign Application Priority Data

Dec. 7, 1979 [JP] Japan .................. 54/158056

[51] Int. Cl.³ ............... H01F 27/32; B32B 19/00; B32B 27/38
[52] U.S. Cl. ............... 336/205; 174/120 SR; 336/206; 428/324; 428/363; 428/413; 428/417; 428/418; 428/429; 428/447; 428/454; 528/16; 528/27; 528/92
[58] Field of Search .............. 428/324, 906, 417, 418, 428/413, 429, 454, 447, 363; 528/16, 27, 92; 336/206, 205; 174/120 SR

[56] References Cited

U.S. PATENT DOCUMENTS

| 3,624,032 | 11/1971 | Miyashiro | 528/107 |
| 3,926,885 | 12/1975 | Keil | 525/476 |
| 3,971,747 | 7/1976 | Bank | 525/476 |
| 4,013,987 | 3/1977 | Foster | 428/324 |
| 4,082,719 | 4/1978 | Liles | 528/16 |
| 4,239,998 | 12/1980 | Hakamada | 428/324 |
| 4,244,911 | 1/1981 | Ishizaka | 428/324 |
| 4,335,367 | 6/1982 | Mitsui | 428/413 |

FOREIGN PATENT DOCUMENTS

| 576099 | 5/1959 | Canada | 528/27 |
| 664200 | 6/1963 | Canada | 528/27 |

Primary Examiner—Ellis P. Robinson
Attorney, Agent, or Firm—Oblon, Fisher, Spivak, McClelland & Maier

[57] ABSTRACT

An electrically insulated coil comprising a coil; and a mica tape wound around said coil and containing a resin composition; said resin composition including an epoxy resin, a curing catalyst consisting of an aluminum compound, and a curing accelerator selected from the group consisting of a silane compound having a hydroxyl group and a polysiloxane compound having a hydroxyl group, said curing catalyst being added in an amount of 0.1 to 5% by weight based on said epoxy resin, said curing accelerator being added in an amount of 0.1 to 10% by weight based on said epoxy resin, and said resin composition being cured by heating after said mica tape is wound around said coil.

4 Claims, 2 Drawing Figures

ELECTRICALLY INSULATED COIL

BACKGROUND OF THE INVENTION

The present invention relates to an electrically insulated coil obtainable by winding around a coil a mica tape which cures at a relatively low temperature and has a long storage life, providing a coil having excellent properties with respect to heat resistance, mechanical characteristics, and electrical insulation characteristics.

Recently, as electric appliances have been of a smaller size, there has been a growing demand for electrically insulated material possessing a higher resistance to heat so that there has been progress in the development of class H insulation continuously operable below 180° C. Heretofore, it was known that a heat-resistant resin for class H insulation includes an aromatic polyimide resin, a silicone resin or the like. The polyimide resin, however, employs a polar solvent so that its use may cause operating and sanitation problems. Furthermore, its final curing temperature is high and it produces water during the curing reaction so that the formation of a minute and elaborate insulating structure requires involved operational conditions. Accordingly, its use has been limited to the preparation of a wire or film. The silicone resin, on the other hand, also has a high final curing temperature, and a cured insulating material has defects in that its mechanical characteristics and electrical insulation characteristics are slightly inferior. As a resin for class H insulation, a resin using as a raw material a maleimide compound is known. Where the maleimide compound is used as the raw material, however, the resin produced by curing has a defect in that it is mechanically brittle and has few practical applications.

As a result of extensive research, the inventors have found that a composition consisting of an epoxy resin, when heat-cured in the presence of an aluminum compound such as aluminum trisacetylacetonate as a curing catalyst, can provide a cured resin possessing favorable mechanical strength and excellent heat resistance. This curing, however, usually requires a long reaction period ranging from several hours to several tens of hours at 150°–250° C. Accordingly, as a result of further research on this point, it has now been found that, when a small amount of a curing accelerator such as a silane compound or a polysiloxane compound, each having a hydroxyl group, is added to a composition system consisting of an epoxy resin, and an aluminum compound, there is provided a curing composition that is stable at room temperature and has a long storage life. Furthermore, it is cured by the aid of a remarkable curing accelerating action at a temperature which is not so high and in a short time to provide a cured resin having no mechanical brittleness and having excellent heat resistance.

SUMMARY OF THE INVENTION

The object of the present invention is to provide an electrically insulated coil that be prepared at less cost and which possesses high heat resistance and mechanical strength as well as excellent electrical insulation characteristics.

According to the present invention, an electrically insulated coil is provided which comprises a coil; and a mica tape wound around said coil and containing a resin composition; said resin composition including an epoxy resin, a curing catalyst consisting of an aluminum compound, and a curing accelerator selected from the group consisting of a silane compound having a hydroxyl group and a polysiloxane compound having a hydroxyl group, said curing catalyst being added in an amount of 0.1 to 5% by weight based on said epoxy resin, said curing accelerator being added in an amount of 0.1 to 10% by weight based on said epoxy resin, and said resin composition being cured by heating after said mica tape is wound around said coil.

BRIEF DESCRIPTION OF THE DRAWINGS

This invention can be more fully understood from the following detailed description when taken in conjunction with the accompanying drawing, in which.

DESCRIPTION OF THE PREFERRED EMBODIMENT

Figure 1:
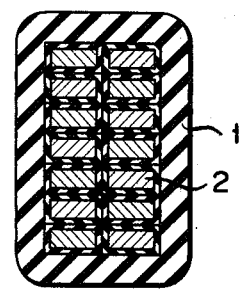
FIG. 1 is a sectional view illustrating one embodiment of an electrically insulated coil of the present invention.

In accordance with the present invention, as the epoxy resins to be used as a component of the mica adhesives, suitable examples are: bisphenol A series epoxy resins; bisphenol F series epoxy resins; phenol novolak series epoxy resins; cresol novolak series epoxy resins, alicyclic epoxy resins; heterocycle-containing epoxy resins such as triglycidyl isocyanate or hydantoin epoxy; hydrogenated bisphenol A series epoxy resins; aliphatic epoxy resins such as propylene glycol dicresyl ether or pentaerythritol polyglycidyl ether; epoxy resins obtainable by the reaction of an aromatic, aliphatic or alicyclic carboxylic acid with epichlorohydrin; spirocycle-containing epoxy resins; glycidyl ether series epoxy resins obtainable by the reaction of an o-allylphenol novolak compound with epichlorohydrin; glycidyl ether series epoxy resins obtainable by the reaction of a diallyl bisphenol compound having allyl groups at the ortho position of each of the hydroxyl group of bisphenol A, or the like.

Furthermore, for the aluminum compounds to be used as a curing catalyst in the presence of the silane compound or the polysiloxane compound, each having a hydroxyl group, suitable examples are compounds represented by the general formula:

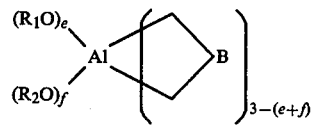

(in which each of $R_1$ and $R_2$ is independently an alkyl group), e and f are 0 or integers between 1 and 3, inclusive, such that the total of $e+f$ does not exceed 3, and B is a ligand selected from the group consisting of compounds represented by the following formulas:

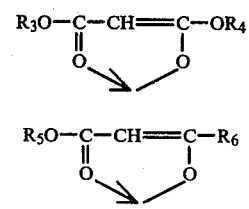

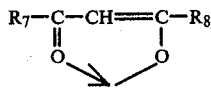

(wherein each of R₃–R₈ is an alkyl group).

Of these aluminum compounds, aluminum trisalkyl acetoacetate, aluminum trisacetylacetonate, aluminum alcoholate, aluminum acylate and the like are particularly useful, and they may be used in amounts of approximately 0.1 to 5% by weight with respect to the epoxy resin in accordance with the present invention.

The silane compounds or the polysiloxane compounds, each having a hydroxyl group, to be used in accordance with the present invention as a curing accelerator in the presence of the aluminum compound, may include, for example, a silane compound represented by the general formula:

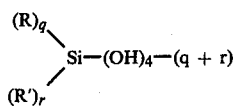

(wherein each of R and R' is independently an alkyl group, a phenyl group, and aralkyl group, a vinyl group or an allyl group and may be identical or different, and each of q and r is 0 or an integer between 1 and 3, inclusive, such that the total of q+r does not exceed 3) or a polysiloxane compound represented by the general formula:

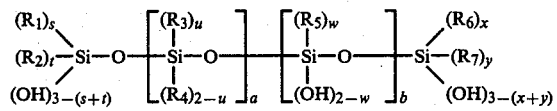

(wherein each of R₁–R₇ is a monovalent organosiloxane with or without, identically or differently, an alkyl group, a phenyl group, a vinyl group, an aralkyl group, an allyl group or a hydroxyl group; each of s, t, x and y is 0 or an integer between 1 and 2, inclusive, the sum s+t and the sum x+y not exceeding 2; each of u an w is 0 or an integer between 1 and 2, inclusive; and each of a and b is 0 or an integer of 1 or more). These organosilanol compounds are preferably employed in amounts of at least 0.1% by weight based on the epoxy resin. They may be employed up to about 10% by weight to facilitate curing acceleration.

An example of the present invention will now be described.

To a mixture of bisphenol A series epoxy resins consisting of 70 parts by weight of Epikote 828 (trade name: Shell Chemical Corp.) and 30 parts by weight of Epikote 1001 (trade name: Shell Chemical Corp.), was added a solution of 2 parts by weight of aluminum trisacetylacetonate and 3 parts by weight of a polysiloxane compound SH6018 (trade name: Shinetsu Silicone K.K.) in methyl ethyl ketone to provide a solution of an adhesive. After impregnating laminated mica sheet of 160 g/m² backed with 35 μm woven glass cloth with this solution, the sheet was dried and a prepreg mica sheet was obtained. In this case, if it is dried while degassing under a reduced pressure, the sheet may be placed into stage B without shortening the storage life. The optimal amount of adhesive differs according to the kind of laminated mica. It is 25 to 40% by weight in the case of laminated mica of non-sintered type, and 35 to 50% by weight in the case of laminated mica of sintered type.

The mica sheet thus obtained is cut to a suitable width to provide a laminated mica tape in the form of a prepreg. As shown in FIG. 1, after winding the laminated mica tape 1 around a coil conductor 2, it was pressed in a hot press for 1 to 2 hours with a compressibility of about 15 to 30% for precuring at 150° to 160° C. The compressibility=(insulator thickness before pressing−insulator thickness after pressing)÷(insulator thickness before pressing)×100(%). The semicomplete insulated coil thus obtained was housed in an iron core, and windings were connected. The connected parts were insulated, and vibration preventive measures were taken, such as wedging and winding of glass code. The coil as a whole was post-cured at 150° to 160° C. for 15 hours to provide a heat-resistant electrically insulated coil.

Figure 2:
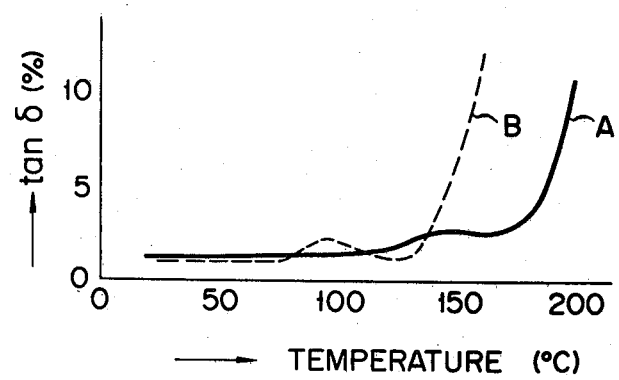
FIG. 2 is a graph illustrating the temperature tan δ characteristic of the insulated coil of FIG. 1 and a conventional class F insulated coil.

The prepreg mica tape obtained in this embodiment has a long storage life of over 6 months at a temperature below 15° C. In spite of the curing at a relatively low temperature, namely, 150° to 160° C., the curve A of this embodiment shows a smaller dielectric dissipation factor (tan δ) at a higher temperature than with the curve B of the conventional F class insulation coil, as shown in FIG. 2. The dielectric breakdown voltage at 180° C. was 28 kV/mm for this embodiment and 18 kV/mm for the conventional F class insulation coil.

Thus, the electrically insulated coil of this embodiment has a small dielectric dissipation factor at a high temperature, a high dielectric breakdown voltage at a high temperature, and high heat-resistance.

The present invention is not limited to the particular embodiment described above and shown in the drawings. It is thus to be understood that various modifications may be made within the scope of the present invention. For example, it is possible to use, as the mica, splitting mica or flake mica instead of the laminated mica, or to use a heat-resistant film or a heat-resistant paper sheet of aramid (aromatic amide) or the like instead of a woven glass sheet.

The prepreg mica tape of the present invention has a long storage life and cures at a relatively low temperature as has been described earlier. Therefore, the electrically insulated coil obtained by winding this on a coil is economical, heat-resistant, has a small dielectric dissipation factor at a high temperature, and has a high dielectric breakdown voltage, providing an excellent heat-resistant electrically insulated coil.

What is claimed is:

1. An electrically insulated coil comprising:
   a coil; and
   a mica tape containing a resin composition wound about said coil;
   said resin composition comprising an epoxy resin, an aluminum complex curing catalyst having the formula:

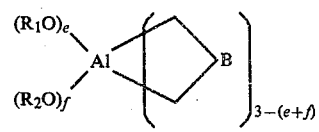

wherein $R_1$ and $R_2$ independently are each an alkyl group, e and f are 0, 1, 2 or 3 with the total of e+f not exceeding 3 and wherein B is a ligand selected from the group consisting of:

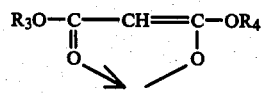

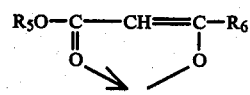

and

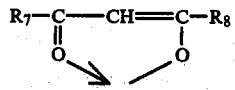

wherein groups $R_3$–$R_8$ independently of one another are alkyl, and a silane compound curing accelerator of the formula:

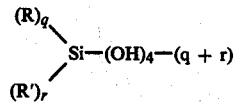

wherein R and R' independently of one another are alkyl, phenyl, aralkyl, vinyl or allyl, q and r are 0, 1, 2 or 3 with the sum of q and r not exceeding 3 or a polysiloxane curing accelerator of the formula:

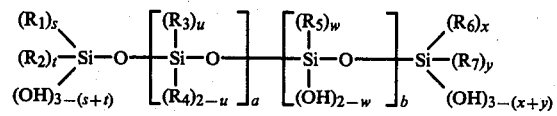

wherein groups $R_1$–$R_7$ independently of each other are a monovalent organosiloxane group optionally substituted by alkyl, phenyl, vinyl, aralkyl, allyl or hydroxyl; each of s, t, x and y, being 0, 1 or 2 with the sum of s+t and the sum of x+y each not exceeding 2, u and w each being 0, 1 or 2 and a and b each being 0 or an integer of 1 or more, said curing catalyst being present in said composition in an amount of 0.1 to 5% by weight based on the epoxy resin, and said curing accelerator being present in said composition in an amount of 0.1 to 10% by weight based on said epoxy resin; and curing said composition by heating the same after said mica tape is wound around said coil.

2. The insulated coil of claim 1, wherein said mica tape is a compound mica tape backed with a glass cloth.

3. The insulated coil of claim 1, wherein said epoxy resin component is selected from the group consisting of bisphenol A epoxy resins, bisphenol F epoxy resins, phenol novolak epoxy resins, cresol novolak epoxy resins, alicyclic epoxy resins, heterocycle group containing epoxy resins, hydrogenated bisphenol A epoxy resins, aliphatic epoxy resins, epoxy resins obtained by reacting an aromatic, aliphatic or alicyclic carboxylic acid with epichlorohydrin, spirocycle group containing epoxy resins, glycidyl ether epoxy resins obtained by reacting an o-allylphenol novolak compound with epichlorohydrin and glycidyl ether epoxy resins obtained by reacting a diallyl bisphenol compound containing allyl groups in the ortho position relative to the hydroxyl groups of the bisphenol component.

4. The insulated coil of claim 1, wherein said aluminum complex curing catalyst is aluminum trisalkylacetoacetate or aluminum trisacetylacetonate.

* * * * *